INVENTORS
NORMAN W. UPTON
EUGENE L. KEMPER
ROGER L. BRUMMEL

ATTORNEYS

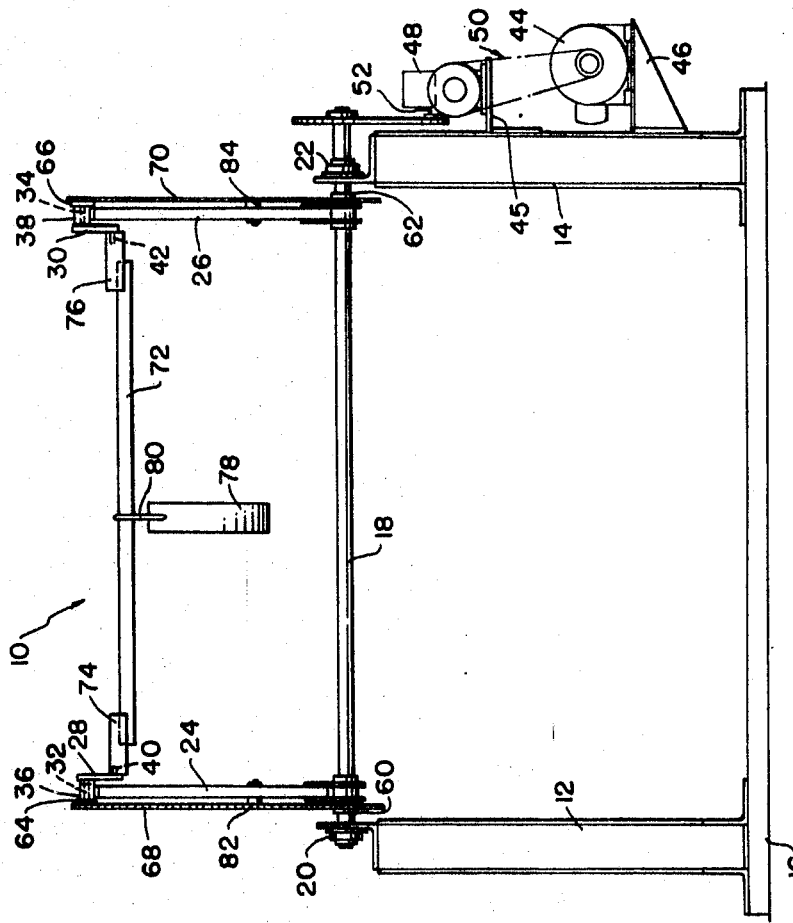
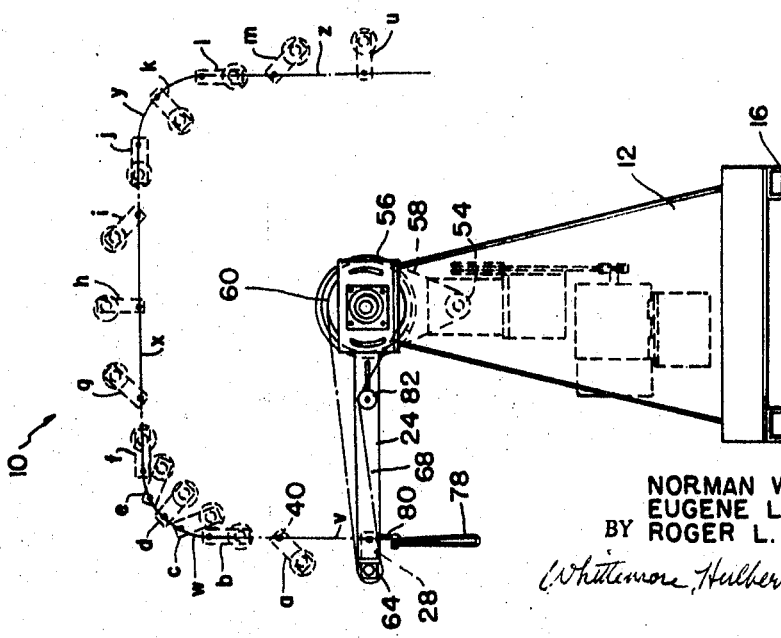

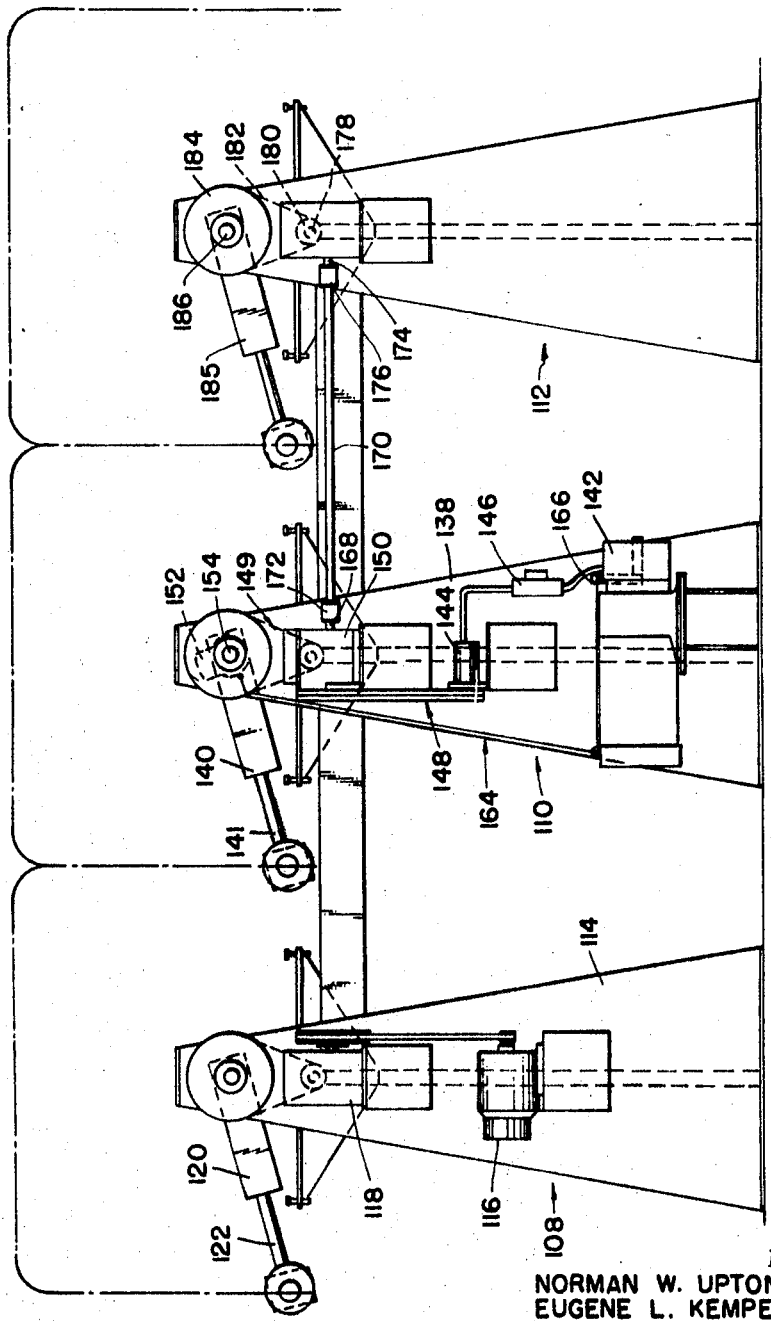

INVENTORS
NORMAN W. UPTON
EUGENE L. KEMPER
BY ROGER L. BRUMMEL

*Whittemore, Hulbert & Belknap*

ATTORNEYS

United States Patent Office 3,459,313
Patented Aug. 5, 1969

3,459,313
WORK TRANSPORTING APPARATUS
Norman W. Upton and Eugene L. Kemper, Mount Clemens, and Roger L. Brummel, Warren, Mich., assignors to Upton Electric Furnace Company, Inc., Roseville, Mich., a corporation of Michigan
Filed June 28, 1967, Ser. No. 649,571
Int. Cl. B25j 11/00, 13/00
U.S. Cl. 214—1                             11 Claims

ABSTRACT OF THE DISCLOSURE

Apparatus is provided for quickly transporting a workpiece from one station to another. A main arm is rotated about an axis between the two stations. The main arm carries a secondary arm which receives the workpiece. The secondary arm rotates simultaneously with the main arm. In one embodiment, the secondary arm rotates at an angular speed greater than that of the main arm. In another embodiment, the two arms rotate at the same speed while the secondary arm is telescoped in an out of the main arm. The secondary arm has a work-carrying structure. The workpiece is loaded onto the work-carrying structure. In one embodiment, the angular speeds of the main and secondary arms and the lengths of these members are so proportioned, and in the other embodiment the telescoping action is such, that the work-carrying structure follows a path from one station to the next consisting of a first relatively vertical portion, a second short curved portion, a third relatively horizontal portion, a fourth short curved portion and a fifth relatively vertical portion.

Background of the invention

There are many instances in manufacturing processes where it is desired to move a workpiece quickly from one station to another. For example, in heat treating processes, it may be necessary to transfer a workpiece from a furnace to a liquid quench in a matter of a few seconds, as for example from three to five seconds. Such workpieces are normally carried in a basket or by a hanger element which is in turn suspended on a conveyor structure for movement from station to station. Conventional conveyor systems have comprised a main conveyor for moving the workpieces from station to station and secondary conveyors at each station for moving the workpiece through the station which may be a furnace, quench, and the like. Mechanisms have been developed for transferring the workpieces from one conveyor to another. The apparatus for carrying the workpieces ordinarily includes a hook-type hanger element for pivotal suspension from a conveyor. It will be appreciated that such a method of suspension permits swinging of the workpiece. It is difficult to utilize conventional conveyor structures to rapidly move a workpiece without causing swinging of the parts. There are several objections to such swinging. For instance, if the workpiece is to be lowered into a liquid quench tank, the swinging will cause splashing of the liquid. Additionally, an opening in the tank sufficient to accommodate the arc of the swinging part is required. Swinging is further objectionable because it may cause the workpiece to become disengaged from the conveyor and it may result in distortion of the workpiece.

It is also difficult to design conventional conveyors which are able to carry workpieces rapidly enough to meet the requirements of some processing steps. This is particularly true in the case of moving a part from a high temperature furnace into a liquid quench tank. It is, of course, desirable to minimize the heat loss in the transfer from the furnace to the quench.

The present invention provides a transfer device which minimizes swinging of workpieces and which permits rapid transfer of workpieces from one station to another. Further, the structure is readily integrated into conventional conveyor systems.

Summary of the invention

The apparatus for transporting work between two stations comprises a main arm which is horizontally pivoted between two stations. In one embodiment, a secondary arm is horizontally pivoted to the outer end of the main arm. Support means are carried on the free end of the secondary arm. Drive means are provided for rotating the main arm about its pivot causing the free end to follow a circular path between the two stations. Drive means are also provided for rotating the secondary arm about its pivot in angularly timed relation to the rotation of the main arm. The secondary arm is rotated at a speed such that the support means which it carries is moved in a substantially vertical path in the end portions of the cycle and is moved in a substantially horizontal path in the intermediate portions of the cycle. In another embodiment, the secondary arm is telescoped into and out of the main arm during rotation to result in the support means following the desired path.

In the drawings:

FIGURE 2 is a side elevational view of the structure of FIGURE 1 with portions of the casing removed and illustrating the motion of the main and secondary arms;

FIGURE 3 is a front elevational view of the FIGURE 2 structure with the arms illustrated in an intermediate position;

FIGURE 5 is a side elevational view of three work-transporting devices illustrating a telescoping secondary arm;

Figure 1:
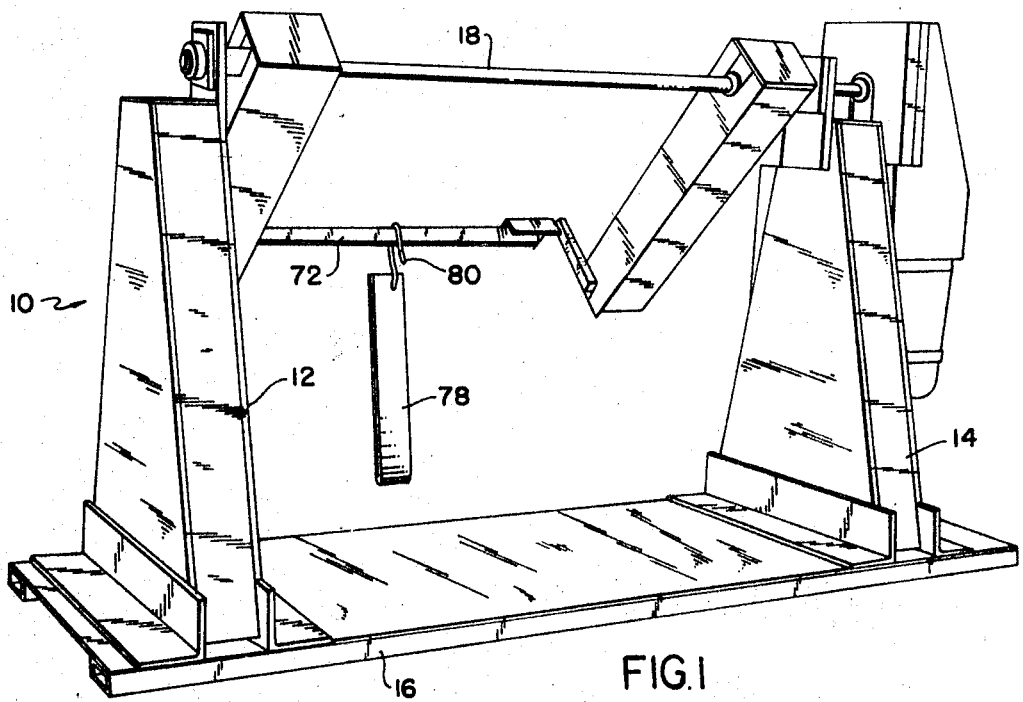
FIGURE 1 is a view in perspective of one embodiment of the work-transporting apparatus of the present invention.

Referring first to FIGURES 1–3, it will be noted that the work-transporting apparatus 10 includes a pair of spaced apart vertical supports 12, 14 which are mounted on a horizontal support structure 16. A shaft 18 extends between the supports 12, 14 and is suitably journaled in bearings 20, 22. A main arm 24, 26 is carried on the shaft 18 adjacent each of the supports 12, 14. The arms 24, 26 form the main arm structure. The arms 24, 26 are fixedly secured to the shaft 18 and extend right angularly therefrom. The arms are of equal length and are in alignment with each other.

A secondary arm 28, 30 is carried on the outer end of each main arm. The arms 28, 30 form the secondary arm structure. A shaft 32, 34 extends right angularly from each secondary arm 28, 30 and is suitably journaled in bearings 36, 38 carried on the ends of the main arms 24, 26. It will be noted that the secondary arms are in alignment with each other and that these arms are relatively short with respect to the main arms 24, 26. The proportions of the arms are of importance in the invention in that these proportions have a bearing on the path which these arms will take. It has been found in practice that one optimum ratio of secondary arm to main arm is 1:8.625. The ratio may vary from 1:8 to 1:9. Each secondary arm carries a pick-up pin 40, 42. The abovementioned length is measured from the center of the pin to the center of the axis of the shaft of the secondary arm. The length of the main arm is measured from the center of the shaft 18 to the center of the secondary arm shaft.

The drive system for the apparatus comprises a variable speed reversible electric motor 44 which is carried on a support platform 46, the platform 46 being secured to the vertical support member 14. The motor 44 is drivingly connected to a speed-reducer 48 by means of a belt and sheave mechanism 50. The speed-reducer is mounted on a platform 45. The output shaft 52 of the speed-reducer carries a sprocket 54. A larger sprocket 56 is carried on the outer end of the shaft 18. A chain 58 connects the sprockets. It will be appreciated that the drive train thus far described is operative to rotate the shaft 18.

A sprocket 60, 62 is carried at each end of the shaft 18 adjacent to the main arms 24, 26. A smaller sprocket 64, 66 is carried on the outer ends of each secondary arm shaft 32, 34. Chains 68, 70 connect these sprockets in driving relationship. Referring to FIGURE 2, it will be noted that the sprocket 60 carried by the shaft 18 is of considerably larger diameter than the sprocket 64. The relationship of the diameters of these sprockets determines the relative angular speeds of the main and secondary arms. In the embodiment illustrated, the increase in angular speed from the large to the small sprocket is 4:1.

The pins 40, 42 are adapted to pivotally engage a work-carrying rod 72 which extends between the arms. The rod is provided with an angle member 74, 76 at each end to receive the pins. A workpiece 78 is illustratively suspended from the rod 72 by means of a hook-type hanger 80.

An idler sprocket 82, 84 is provided on each main arm to make the chains 68, 70 taut. The idler sprockets are mounted in slots provided in the arms for longitudinal adjustment thereof.

The operation of the apparatus may now be understood. Referring to FIGURE 2, it will be noted that the primary arm structure is initially oriented in a horizontal plane on the left side of the apparatus. It should be appreciated that the main arm may be angled upwardly or downwardly from the position illustrated and also may initially be located on the right-hand side of the apparatus for transfer of work from the right-hand to the left-hand side of the apparatus.

The secondary arm structure is also located in a horizontal plane. However, the secondary structure is displaced 180° with respect to the main arm structure. As the main arm structure is rotated in the clockwise direction, the secondary arm structure is rotated in the opposite direction, that is, counterclockwise, as will be noted by the dotted line position A. Continued rotation of the main arm structure results in the secondary arm structure being rotated to position B where the secondary arm structure is oriented vertically. The path followed by the pick-up pins on the secondary arm structure during this portion of rotation is indicated by the dotted line V. It will be noted that this path is substantially vertical. In actual practice, there is a slight curvature in the path. However, this curvature has a minimal effect on the work load being transported, there being virtually no swinging. Continued rotation of the main arm structure results in the secondary arm structure assuming positions C, D, E and F. It will be noted that the path of the pickup pins during this portion of the movement of the arm structures, illustrated by the dotted line W, comprises a circular arc having a relatively small radius. The arc W subtends an angle of substantially 90°. This short relatively sharp turn does cause some swinging of the workpiece. However, the swinging is not violent and exists for only a short period of time.

Continued rotation of the main arm structure results in the secondary arm structure being rotated to positions G, H, I and J. The path of the pickup pins during this portion of movement is a relatively horizontal component indicated by the dotted line X. Again there is a slight curvature to this movement. During the horizontal portion of movement, the swinging caused by moving through the arc W is dissipated.

It will be noted that at position H, the secondary arm structure has returned to its initial position with respect to the main arm. At this point, the main arm structure has moved through an angle totaling 90°, while the secondary arm structure has moved through an angle totaling 360° with respect to the main arm. This established a relative angular speed of secondary arm structure to main arm structure of 4:1.

Continued movement of the main arm structure results in the secondary arm structure moving from position J to positions K and L. Again, this movement results in the pickup pins following a circular path as noted by the dotted line Y. The angle subtended by the arc Y is also substantially 90°. The work has thus travelled through 180°, which is the entire angle through which it must pass to reach the opposite side of the work transporting apparatus.

Travel through the arc Y again causes some slight swinging of the work. However, this swinging subsides during the remaining relatively vertical path of the pickup pins. Continued rotation of the main arm results in the secondary arm moving to positions M and N. The path of the pickup pins through this portion of the cycle is denoted by the dotted line Z. This path is substantially vertical, but has, as previously pointed out, a slight curvature. At the termination of the movement of the arm structures, the secondary arm structure is again in a horizontal position and is displaced 180° from the main arm structure. The workpiece is stable at the end of the cycle.

The workpiece may then be transferred to another conveyor. Return of the arm structures to the initial position may be accomplished by means of a limit switch (not shown) causing the motor 44 to reverse. Similarly, initiation of the cycle may be means of a limit switch as is conventional.

A control device is provided to vary the speed of the motor 44 during the cycle. The motor speed is gradually accelerated to normal operating speed at the beginning of the cycle and is gradually decelerated at the end of the cycle so that the work is gently lifted and lowered. This prevents damaging the various structures involved or dislodging the work. Additionally, this prevents splashing when the work is to be raised or lowered into a tank containing a liquid, such as a brine quench or paint.

Figure 4:
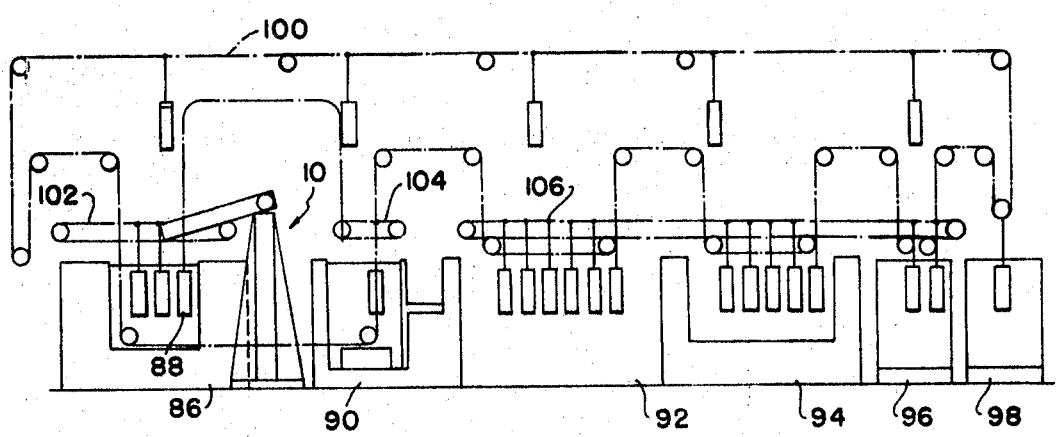
FIGURE 4 is a diagrammatic view of a processing system incorporating the work-transporting apparatus of the invention.

FIGURE 4 illustrates integration of the work transporting apparatus 10 into a relatively conventional automatic heat-treating system. In the illustrated system, six processing stations are provided. Station 86 is a high temperature furnace in which the work 88 is brought to an elevated temperature and held at that temperature for a predetermined length of time. Station 90 is a brine quench. The work transporting apparatus 10 is positioned between stations 88 and 90 to provide rapid transfer from the furnace to the quench. This rapid transfer avoids any significant heat loss of the work which would result in improper quenching.

The work is air-cooled at station 92 and tempered at station 94. Finally the work is washed at station 96 and rinsed at station 98.

A main chain conveyor 100 extends throughout the entire system. The conveyor 100 is used for loading, unloading, transferring and returning the work. Separate process conveyors 102, 104 and 106 are provided at the stations to receive the work either from the main conveyor 100 or work transporting apparatus 10. The conveyors 102, 104, 106 are operated at a times rate to move the work through each station at a predetermined rate to thus hold the work in each station for the required length of time.

Figure 6:
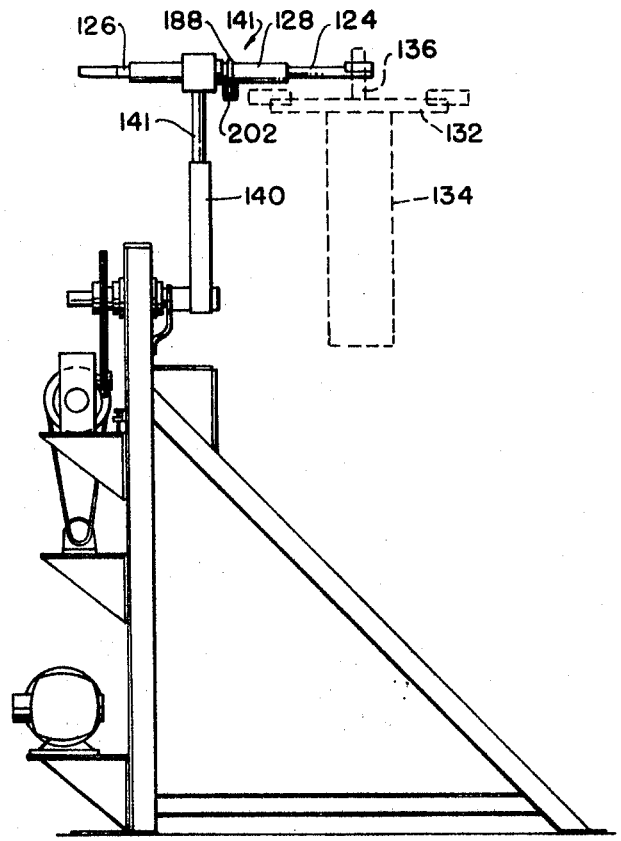
FIGURE 6 is a front elevational view of the center mechanism of FIGURE 5.
Figure 7:
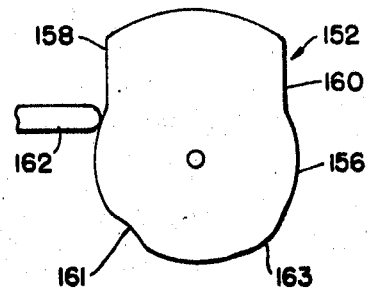
FIGURE 7 illustrates a control cam utilized in the FIGURE 5 embodiment.

FIGURES 5-7 illustrate modifications of the basic design. Three separate work transporting devices 108, 110, 112 are shown in FIGURE 5.

The apparatus 108 is similar in many respects to the apparatus illustrated in FIGURES 1-3. Apparatus 108 includes a support structure 114, electric drive motor 116, speed-reducer 118 which drives the primary arm structure 120. The secondary arm structure 122 is telescoped in the main arm, as will described in connection with the device 120. There is a single main arm and a single secondary arm as opposed to the dual arm structures of FIGURES 1-3.

The apparatus 110 is similar in many respects to the apparatus 108. However, the apparatus 110 is provided with a hydraulic drive rather than an electrical drive. As will be noted, the apparatus 110 comprises a vertical support structure 138 and has a main arm structure 140 into which is telescoped the secondary arm structure 141.

An oil pump 142 is suitably mounted on the support 138. A hydraulic motor 144 is also mounted on the support 138. Oil under pressure is delivered to the motor 144 from the pump via a valve 146 which controls the flow to the motor. A belt and sheave structure 148 connects the outlet shaft of the motor to the input shaft of a speed reducer 150, from whence the main arm structure is driven via sprocket and chain structure 149.

A cam 152 is provided on the outer end of shaft 154, this being the shaft upon which the primary arm is mounted. The cam, as best seen in FIGURE 7, has a circular portion 156. The circular portion 156 terminates in rises 158, 160. A cam follower 162 is in contact with the cam. The cam follower is connected by linkage 164 (FIG. 5) to a switch arm 166 which controls the pump 142. At the termination of movement of the arm structure either from the extreme left or extreme right position, the cam follower contacts one of the rises 158, 160 causing movement of the arm 166 to thereby cease delivery of oil under pressure to the motor 144. The rises 158, 160 cause the cam follower to move gradually, thus resulting in gradual acceleration and deceleration of the motor 144. This results in gently picking up and depositing the work.

The cam 152 is provided with an indentation at 161 to increase the motor speed and a rise at 163 to decrease the speed. This counteracts the inertial effects of the load and inhibits swinging. The location of a rise or an indention depends on the nature of the load and may be varied as needed.

The valve 146 is a reversing valve and functions to deliver oil to the motor causing the motor to rotate in one direction or the other. The valve 146 may be of the solenoid type and actuated by suitable switching mechanism (not shown).

The secondary arm structure 141 is provided with means for automatically retracting and extending the pickup pin 124. As illustrated in FIGURE 6, a pneumatic cylinder 126 is mounted on the extremity of the main arm 140. The secondary arm has a telescoping structure comprising an outer sleeve 128 which slidably receives the pickup pin 124. The pin 124 is extended and retracted by actuation of the cylinder 126. A work carrying rod 132 and workpiece 134 are illustrated in dotted lines. The rod 132 has a hanger assembly 136 which projects upwardly therefrom. The pin 124 may be extended to engage the assembly 136. After completion of a cycle, the workpiece is transferred to the adjacent work transporting apparatus by means of the work carrying rod 132. During the transfer, the pin 124 is retracted to disengage the hanger assembly 136. Actuation of the cylinder 126 is accomplished in timed relation to the cycle by conventional control means.

Figure 8:
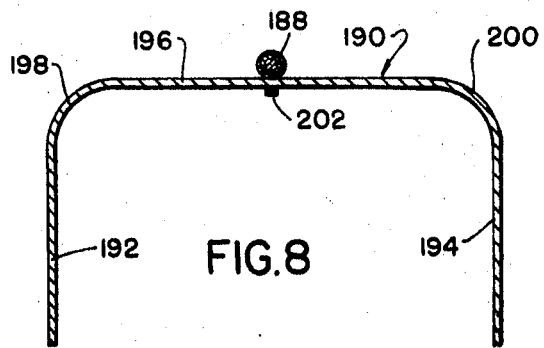
FIGURE 8 illustrates means for guiding the secondary arm.

Referring to FIGURES 6 and 8, it will be noted that the sleeve 128 has a roller 188 mounted thereon. The roller 188 rides on the outer surface of a U-shaped guide 190. The guide 190 has a configuration similar to the configuration of the path of the pickup pin as described in connection with FIGURES 1-3. The guide 190 comprises vertical legs 192, 194, horizontal member 196 and curved corner portions 198, 200. A U-shaped bracket 202 extends from the sleeve 128 around the guide. There is some clearance between bracket 202 and the guide.

In operation, the guide 190 causes the arm 141 to telescope in and out of the main arm 140 to the end that the pickup pin 124 will follow the desired path during rotation of the main arm. The roller 188 rides on the guide during the horizontal portions of the cycle. The weight of the work is thus carried by the guide during this portion of travel and the use of the roller results in rolling friction only. During vertical portions of travel, either the roller 188 or bracket 202 may contact the guide to maintain the desired path, friction not being a problem during this portion of travel.

While mechanical guide means have been illustrated for movement of the arm 141, it will be appreciated that other means, such as an air or hydraulic cylinder along with suitable control means may be used for this purpose.

The apparatus 112 illustrates another means for driving the arm structures. The output shaft 168 of the speed reducer 150 of apparatus 110 extends outwardly from both sides of this unit. A tandem drive shaft 170 is connected to the shaft 168 by means of a coupling 172. The opposite end of the shaft 170 is connected to a shaft 174 by coupling 176. The shaft 174 is geared to a shaft 178 which drives a sprocket 180. The sprocket 180 is connected, via chain 182, to a sprocket 184 which in turn drives a shaft 186 upon which the main arm structure 185 is mounted. It will be noted that this construction avoids the necessity for a separate drive system for the apparatus 112.

What we claim as our invention is:

1. Apparatus for transporting work between two stations comprising a main arm structure horizontally pivoted between said stations, a secondary arm structure carried by said main arm structure, work support means carried by the secondary arm structure, drive means for rotating said main arm structure between the stations, means for simultaneously moving said secondary arm structure to result in a path of motion for the work support means between the two stations comprising a first upward substantially vertical portion, said vertical portion being substantially straight for a length at least as great as the secondary arm, and a final downward substantially vertical portion similar to said first upward vertical portion, with a smooth transition through a substantially horizontal intermediate portion.

2. Apparatus for transporting work as defined in claim 1 and further characterized in that said secondary arm structure is horizontally pivoted to said main arm structure, said means for simultaneuosly moving said secondary arm structure comprising second drive means for rotating said secondary arm structure, the relative lengths of the arm structure and the relative speeds of the drive means being proportioned to result in said path of motion for the work support means between the two stations.

3. Apparatus as defined in claim 1 and further characterized in that said secondary arm is a telescopic extension of said main arm, said means for simultaneously moving said secondary arm structure comprising drive means for extending and retracting the secondary arm structure to result in said path of motion for the work support means between the two stations.

4. Apparatus as defined in claim 3 and further characterized in that said drive means for extending and retracting the secondary arm structure comprises the main arm and a guide extending between the stations, said guide having the configuration of the desired path of motion for the work support means, and a follower structure on the secondary arm structure in engagement with the guide.

5. Apparatus as defined in claim 1 and further characterized in that said first drive means comprises a motor drivingly connected to said main arm structure, a tandem shaft driven by the motor, said tandem shaft being connected to a second work transporting apparatus to provide drive means therefor.

6. Apparatus as defined in claim 1 and further characterized in that said first drive means comprises a motor drivingly connected to said main arm structure, cam means carried by said main arm structure, an actuating means in contact with said cam means, and an actuator operatively connected to said actuating means for varying the speed of said motor, said cam being operative to actuate said actuating means at the terminal points of the cycle of the apparatus to thereby discontinue operation of the motor, and being operative during the cycle to accelerate or decelerate to eliminate swinging of the load.

7. Apparatus as defined in claim 1 and further characterized in that said work support means includes a work-engaging member, means receiving said work-engaging member for retraction and extension thereof into and out of engagement with a work load, and power means for retracting and extending said work-engaging member.

8. Apparatus for transporting work between two stations comprising a main arm structure horizontally pivoted between said stations, a secondary arm structure horizontally pivoted to said main arm structure, work support means carried by the secondary arm structure, first drive means for rotating said main arm structure in an angular direction to cause the free end thereof to travel in a circular path between said stations, second drive means for rotating said secondary arm structure in an angular direction counter to rotation of the main arm structure, work support means carried by the secondary arm structure, the relative lengths of the arm structures and the relative speeds of the first and second drive means being proportioned to result in a path of motion for the work support means between the two stations, with the main arm structure being initially directed toward one station and the secondary arm structure being initially directed toward the other station, comprising a substantially vertical path in the end portions of the cycle and a substantially horizontal path in the intermediate portion of the cycle.

9. Apparatus as defined in claim 8 and further characterized in that the ratio of the angular speeds of the secondary arm structure and primary arm structure is substantially 4:1.

10. Apparatus as defined in claim 9 and further characterized in that the ratio of the lengths of the main arm structure, measured from its horizontal pivot to the horizontal pivot of the secondary arm structure, with respect to the length of the secondary arm structure, measured from its horizontal pivot on the main arm structure to the center of the work support means, is substantially from 8:1 to 9:1.

11. Apparatus as defined in claim 8 and further characterized in that said first drive means comprises a motor drivingly connected to said main arm structure, said second drive means comprising a sprocket and chain structure driven by the main arm structure.

References Cited

UNITED STATES PATENTS

| | | | |
|---|---|---|---|
| 3,407,946 | 10/1968 | Pilch | 214—138 |
| 1,835,579 | 12/1931 | Westin. | |
| 3,182,813 | 5/1965 | Goodell. | |

GERALD M. FORLENZA, Primary Examiner

G. F. ABRAHAM, Assistant Examiner

U.S. Cl. X.R.

134—46, 76, 157